United States Patent
Sankar

(10) Patent No.: US 8,249,353 B2
(45) Date of Patent: *Aug. 21, 2012

(54) METHOD FOR FINDING REPRESENTATIVE VECTORS IN A CLASS OF VECTOR SPACES

(75) Inventor: Gomathi Sankar, Bangalore (IN)

(73) Assignee: Sasken Communication Technologies Limited, Bangalore (IN)

( * ) Notice: Subject to any disclaimer, the term of this patent is extended or adjusted under 35 U.S.C. 154(b) by 1689 days.

This patent is subject to a terminal disclaimer.

(21) Appl. No.: 11/548,098

(22) Filed: Oct. 10, 2006

(65) Prior Publication Data

US 2007/0127820 A1    Jun. 7, 2007

Related U.S. Application Data

(62) Division of application No. 10/146,688, filed on May 14, 2002, now Pat. No. 7,120,300.

(51) Int. Cl.
*G06K 9/46* (2006.01)
*G06K 9/66* (2006.01)

(52) U.S. Cl. ............... 382/190; 382/165; 382/170

(58) Field of Classification Search .............. 382/164, 382/165, 168, 170, 190, 225
See application file for complete search history.

(56) References Cited

U.S. PATENT DOCUMENTS

| | | | |
|---|---|---|---|
| 5,245,674 A | 9/1993 | Cass et al. | |
| 5,956,026 A | 9/1999 | Ratakonda | |
| 6,278,446 B1 | 8/2001 | Liou et al. | |
| 6,519,360 B1 * | 2/2003 | Tanaka | 382/162 |
| 6,778,697 B1 | 8/2004 | Shin et al. | |
| 7,120,300 B1 | 10/2006 | Sankar | |

* cited by examiner

*Primary Examiner* — Phuoc Tran
(74) *Attorney, Agent, or Firm* — Schwegman, Lundberg & Woessner, P.A.

(57) ABSTRACT

The present invention provides a technique for retrieving pictures from a large database that is less complex and uses significantly less memory and computational resources than current techniques. This is accomplished by determining representative data vectors based on a tolerance distance that represents data vectors in a given vector space that defines the picture to extract features of the picture that facilitates in retrieving pictures.

18 Claims, 4 Drawing Sheets

METHOD FOR FINDING REPRESENTATIVE
VECTORS IN A CLASS OF VECTOR SPACES

RELATED APPLICATIONS

This application is a Division of U.S. application Ser. No. 10/146,688, filed on May 14, 2002 and issued on Oct. 10, 2006 as U.S. Pat. No. 7,120,300, which is incorporated herein by reference.

FIELD OF THE INVENTION

This invention generally relates to finding representative vectors of a distribution in a vector space, and more particularly to picture retrieval from a large picture database using representative parameters in a vector space.

BACKGROUND

Picture database systems are used to store and manage large amounts of picture data. Picture data can include data such as still pictures (picture data) and motion pictures (video data). Such large picture databases are difficult to browse using text search if the user wants to search for pictures having similar color content. In such large databases, picture features are added to each picture to facilitate faster retrieval of pictures of interest. Users can query such databases based on these added features to retrieve an pictures of interest. One such feature is dominant colors in a picture.

Dominant colors of a picture are defined as the colors that are perceptually dominant in the picture. For example, dominant colors of a picture of a rose plant can be the colors of the rose and the plant. Dominant colors are one of the key features the human mind generally remembers about a picture. In a large picture database, a particular picture of interest can be retrieved efficiently, by specifying one or more dominant colors. Therefore, efficient algorithms are crucial for automatic extraction of dominant colors in stored pictures.

In the past, dominant colors were determined manually by evaluation, one picture at a time, by a trained person. A manual process has two drawbacks, first the number of pictures in modern picture databases can be extremely large and the work involved in manual evaluation can be very tedious. Second in the manual process, the subjective judgment of the evaluator plays a major role in deciding the dominant colors. To overcome theses problems, automatic methods including algorithms have evolved, such as, color group methods and iterative methods for finding dominant colors in a picture stored in large databases.

Color group methods use a set of representative colors. Representative colors are decided manually or derived by quantizing the color space. The colors of each of the pixels in a picture are mapped to the representative colors. The representative colors having the most mappings are considered to be the dominant colors of the picture. However, these methods suffer from quantization effects. For example, pixels in a boundary of a dominant color can be counted in two different representative colors and not as a dominant color.

Iterative methods are automatic solutions to the problem. Here the mathematical models are designed to find representative vectors in the three-dimensional color space. In these methods, the color values of pixels are clustered to get a representative color value for each cluster. These representative colors are used as dominant colors. These methods are iterative and can result in an unknown number of clusters. Clusters that are too close to each other can end up representing visually the same colors. Clusters that are too far from each other can end up encompassing visually different colors into one color.

In a digital video sequence, flow fields of still pictures (pictures) are calculated to represent motion, edge, texture and so on. The flow fields are in two-dimensional vector space having magnitude and direction. Finding the representative vectors in these vector flow fields is a basic problem in analyzing or representing them. The mathematical formulation of this problem is also the problem of finding the representative vectors in 2D vector space. In this method, the vectors are clustered to get representative vectors. Again, this method is very iterative and can result in an unknown number of clusters. Clusters that are too close to each other represent visually the same flow vectors; and clusters that are too far from each other can end up encompassing visually different flow vectors into one representative flow vector.

Due to the above-described problems and restrictions, current algorithms to extract dominant colors from picture in large databases are generally very complex and computationally very intensive. Further, current methods measure the distance between color vectors using Euclidean in CIE-LUV color space. This requires a conversion of RGB to CIE-LUV color space. The conversion of RGB to CIE-LUV color space is very iterative, computationally intensive, and complex. Therefore, such methods generally require a lot of memory and computational resources.

Therefore, there is a need for an algorithm that can automatically extract dominant colors from pictures stored in large databases without requiring a lot of memory and computational resources. There is also a need for an algorithm that is less complex and does not require conversion of RGB to CIE-LUV color space when extracting dominant colors in stored pictures.

SUMMARY OF THE INVENTION

The present invention provides a computationally efficient technique for retrieving pictures from large databases. In one example embodiment, this is accomplished by determining representative data vectors using a tolerance distance that represents data vectors in a given class of vector spaces that defines a picture in order to extract features of the picture.

Another aspect of the present invention is a computer readable medium having computer-executable instructions for retrieving pictures from a large database. Representative data vectors are determined based on a tolerance distance that represents data vectors in a given class of vector spaces that define a picture, to extract features of the picture.

Another aspect of the present invention is a computer system for retrieving pictures from a large database. The computer system comprises a processor, an output device, and a storage device to store instructions that are executable by the processor for repeatedly performing a method. Representative data vectors are determined based on a tolerance distance that represents data vectors in a given class of vector spaces that define a picture, to extract features of the picture.

In yet another aspect of the present invention a feature extraction system extracts dominant colors in a picture for picture processing. The feature extraction system includes an analyzer that determines representative data vectors based on a tolerance distance that represents data vectors in a class of vector spaces that define a picture, to extract features of the picture.

Other aspects of the invention will be apparent on reading the following detailed description of the invention and viewing the drawings that form a part thereof.

BRIEF DESCRIPTION OF THE DRAWINGS

The present subject matter is illustrated by way of example, and not by way of limitation, in the figures of the accompanying drawings in which like reference numerals refer to similar elements.

DETAILED DESCRIPTION

Figure 1:
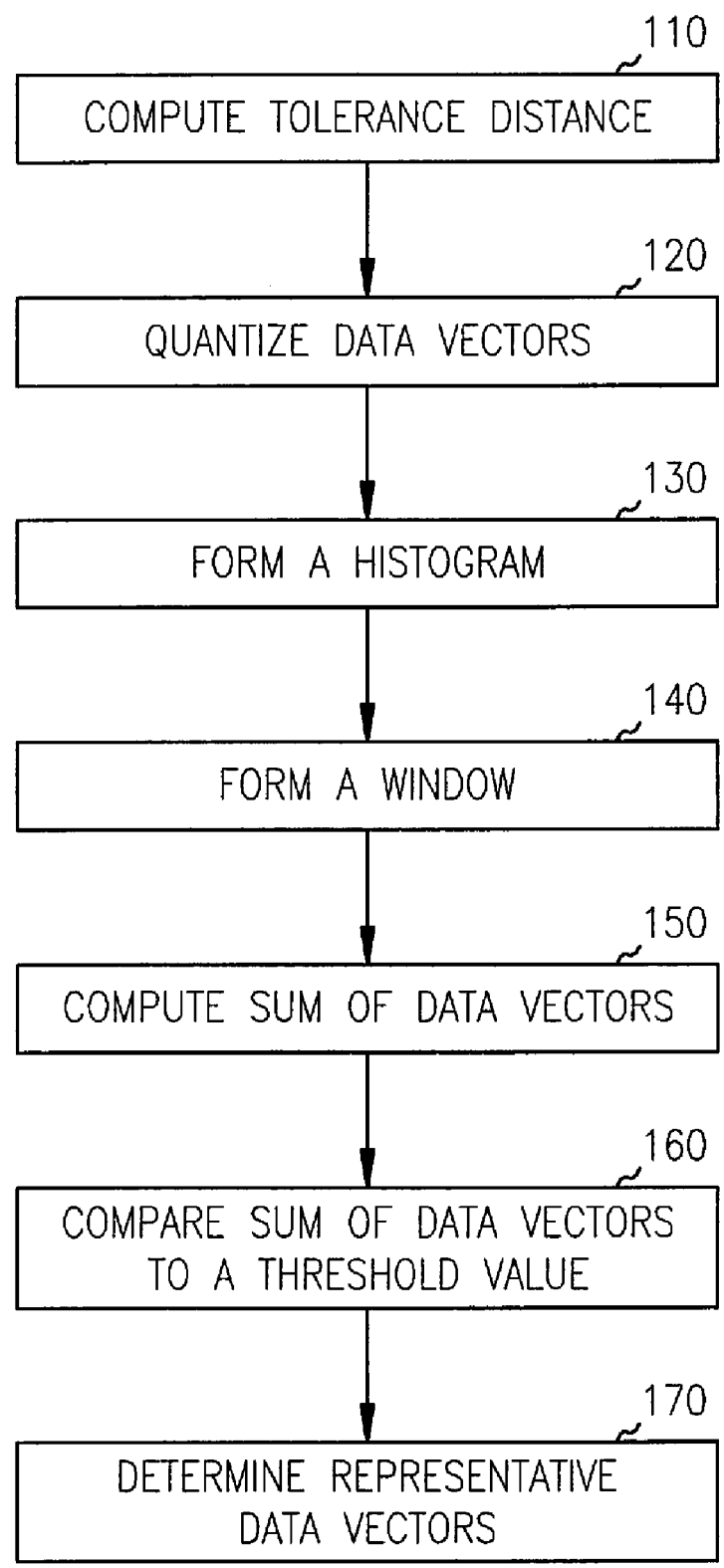
FIG. 1 is a flowchart illustrating one embodiment of a process for extracting feature information from a picture for picture processing.

In the following description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

The following description of the preferred embodiments and various features of the invention are grouped together in a single embodiment for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single disclosed embodiment. Thus the following claims are hereby incorporated into the description of the preferred embodiments, with each claim standing on its own as a separate preferred embodiment of the invention.

The present invention provides an improved algorithm for retrieving pictures from large databases without requiring a significant amount of memory and computational resources. The present invention reduces the computational complexity by not requiring the conversion of RGB color space to CIE-LUV color space.

FIG. 1 is a flowchart illustrating one example embodiment of a process 100 for extracting features in a picture for picture processing. The flowchart includes operations 110-170, which are arranged serially in the exemplary embodiment. However, other embodiments of the invention may execute two or more operations in parallel using multiple processors or a single processor organized as two or more virtual machines or sub-processors. Moreover, still other embodiments implement the operations as two or more specific interconnected hardware modules with related control and data signals communicated between and through the modules, or as portions of an application-specific integrated circuit. Thus, the exemplary process flow is applicable to software, firmware, and hardware implementations.

The process begins with operation 110 by computing a tolerance distance that represents data vectors in a class of vector spaces of a picture. Data vectors can be the color value of pixels in a picture. Vector space can comprise a class of color or vector spaces, such as a one-dimensional gray color space, a three-dimensional RGB color space, a HMMD color space, a HSV color space (a polar coordinate color space), and a linear transformation matrix with reference to RGB color space. Data vectors can include a color value of each of the pixels in a picture based on a predetermined number of color values. In some embodiments, color values used for gray scale and RGB are in the range of 0 to 255.

In some embodiments, tolerance distance is derived based on parameters, such as the human perception to differentiate between data vectors in a vectors space, noise tolerance level for computation of distribution of data vectors, nature of distribution of data vectors in a color space, and meaningful distance between clusters. Clusters are one or more groups of data vectors for a given vector or color space.

For example, tolerance distance in HSV color space can be 30 on the hue coordinate axis with hue being in the range of 0 to 359, and 32 on the saturation coordinate axis with saturation being in the range of 0 to 255. Tolerance distance can be 32 on the value coordinate axis with value being in the range of 0 and 255. Tolerance distance in polar coordinate space can be 30 on the angular coordinate axis with angle having a range of 0 to 359. Further, tolerance distance can be 32 on the magnitude coordinate axis with saturation having a range of 0 to 255.

Tolerance distance is a meaningful average distance for every point in the vector space. It is also referred to as a minimum average distance for every point in the vector space. In vector clustering, vectors in an N-dimensional space are clustered to get a codebook of representative vectors. A representative vector is found by averaging the vectors in a cluster. In some applications, a property is observed on averaging of elements in a vector space during clustering. Such property is referred to as a tolerance of meaningful average distance '$d_{avg}$'. Tolerance distance implies two properties.

The first property is a vector space in which the vectors are separated by a distance greater than the meaningful average distance. Because the average distance here does not represent the original vectors in the vector space, there is no purpose in finding representative vectors. For example, in a color space including colors yellow and red there can be two vectors. Yellow and red are farther apart in distance than the meaningful average distance. If a cluster is generated encompassing these two vectors, the average of these two colors can result in brown, which can become the representative vector. Representing the two colors yellow and red in the color space by brown color will not result in a representative extraction of a feature and is not a proper description of the color content of the color space.

The second property is a vector space in which it is not meaningful to separately represent two vectors that are separated by distance less than the tolerance distance. If the vectors are separately represented, then these two representations essentially form two instances of a single representation, thus adding redundancy to the representation. For example, in a color space, assuming eighty percent of a picture has visually the same color, and if the picture is represented by two colors distributed having 30 and 50 percent of the picture, then the representation of these colors is improper for a human to query.

Tolerance distance is specified for a specific space under specific parameters. Parameters to compute tolerance distance can be based on applications. In applications involving understanding of vectors by human, human perceptual characteristics can be used to derive $d_{avg}$. In applications where the vectors are distorted by noise, $d_{avg}$ can be derived from the characteristics of noise based on how much the noise is contributing to the clusters. In applications involving the mathematical estimation of vectors and as input to a method of finding representative vectors, the estimation of $d_{avg}$ can be based on accuracy.

In applications where the nature of distribution of the vectors result in forming clusters with a meaningful distance between formed clusters, $d_{avg}$ can be used in extracting representative vectors. In applications where $d_{avg}$ is not constant and/or is not independent of an axis, a window having a width of $d_{avg}$ has to be computed for every position in the vector space. In these applications, it is possible to approximate tolerance distance to be constant to improve computational efficiency. The effect of using a constant tolerance distance has to be evaluated for each vector space and application. For example, if the tolerance distance is not independent of the axis, then in an N-dimensional space, using an ellipsoid window can result in computational inefficiency. Computational efficiency can be significantly improved by approximating to independence along the axis, which can lead to an N-dimensional cube.

Operation 120 includes quantizing the data vectors to increase the speed of implementation by reducing the data size for processing. In some embodiments, quantization is derived based on the $d_{avg}$, so that the computed results are not affected. For example, if quantization is very coarse, then one color value can include data vectors that are separated by a distance more than the $d_{avg}$, which can result in incorrect representation of data vectors. In some embodiments, quantizing includes extracting a small number of representative pixels in the picture. For example, quantization of HSV color space can include 24 color values in hue coordinate axis, 16 color values on the saturation coordinate axis, and 32 color values on the value coordinate axis, instead of using 256 color values. In some embodiments, pixels are quantized to extract a small number of color levels for pixels in the picture.

Operation 130 includes forming a histogram using the data vectors based on a predetermined number of color values. In some embodiments, a histogram is formed using quantized data vectors based on the predetermined number of color values. In some embodiments, forming the histogram includes grouping each of the quantized pixels in the picture based on the predetermined number of color values in the color space.

Figure 2A:
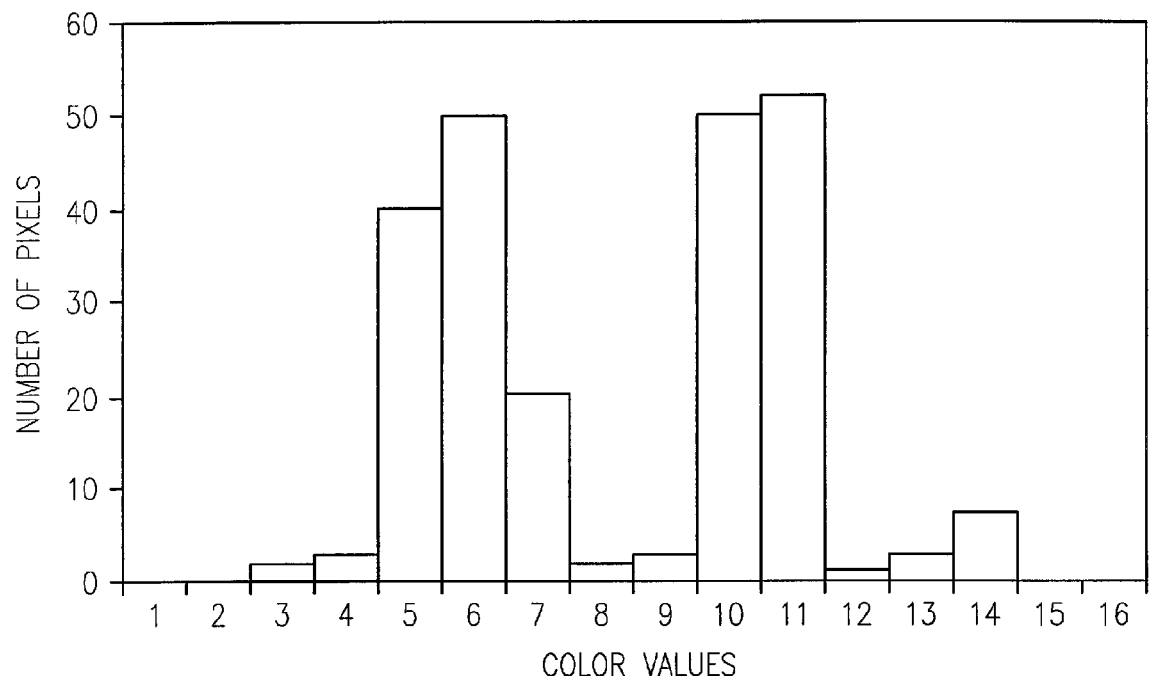
FIGS. 2A and 2B illustrate histograms for finding representative vectors in a two-dimensional color space according to one embodiment of the present invention.

FIG. 2A graphically illustrates the formation of a histogram in a one-dimensional space. The histogram shown in FIG. 2A is formed by grouping the pixels in a picture based on the intensity of the pixels. The x-axis represents the intensity of the pixels based on the predetermined number of color values and the y-axis represents the number of pixels. For example, in FIG. 2A, there are 38 pixels having a color value or intensity of 5; there are 50 pixels having a color value or intensity of 10.

Operation 140 includes forming a window using the computed tolerance distance $d_{avg}$. In some embodiments, a window is formed having a width equal to the computed $d_{avg}$. In some embodiments, formation of the window can be based on approximations of $d_{avg}$, when $d_{avg}$ is constant and independent of axes. In these embodiments, formation of the window can be carried out before the formation of the histogram to enhance speed of feature extraction.

Operation 150 includes computing a sum of number of data vectors falling within a window based on the tolerance distance for each of the color values as the window indexes to a next subsequent color value. In some embodiments, the sum of data vectors are computed by computing the number of quantized pixels falling within the window by adding all of the pixels falling within the window in the formed histogram for each of the indexed window color values.

Figure 2B:
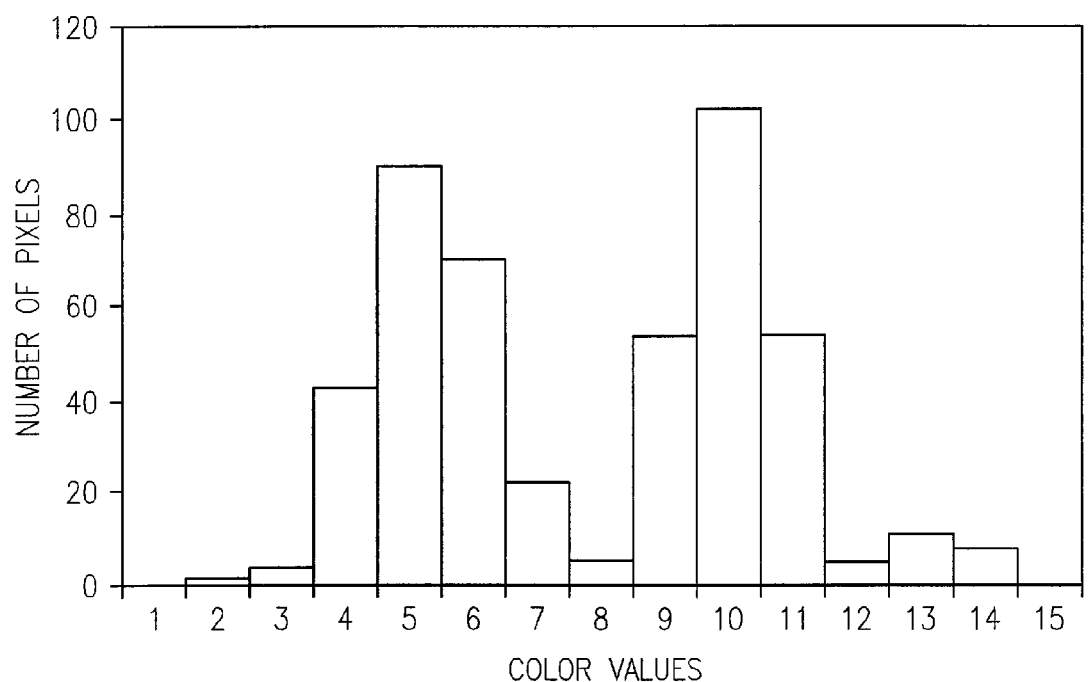

FIG. 2B illustrates a histogram formed using the computed sum of vectors obtained by indexing a window having a width of 2 color values on the histogram shown in FIG. 2A, and a window having a width of 2 color values. For example, the number of pixels at color value 1 in FIG. 2B is obtained by placing the window having the width of 2 color values on the color values 1 and 2 in FIG. 2A. The number of pixels falling within this window is then computed by adding the pixels in the color values at 1 and 2 (which is '0' number of pixels). The computed sum of pixels is then plotted in FIG. 2B at color value 1. The window is then indexed by one color value and placed on subsequent color values 2 and 3. The sum of the number of pixels falling within this window is computed (which is '2'), and plotted in the histogram shown in FIG. 2B at the indexed color position of 2 and so on. The histogram shown in FIG. 2B is formed by repeating the above-described operations to compute the sum of pixels for each of the color values in the predetermined number of color values.

Operation 160 includes comparing each of the computed number of data vectors to a threshold value. In some embodiments, operation 160 includes comparing each of the computed number of pixels to the threshold value. In these embodiments, the threshold value is derived from an application that provides a minimum number of pixels in the distribution that can be recognized to represent the distribution of pixels in a picture.

Operation 170 includes determining representative data vectors to extract dominant colors in the picture based on the outcome of the comparison described in operation 160. In some embodiments, candidate color values that are representative of data vectors in the picture are selected based on the outcome of the comparison. In some embodiments, when the computed number of pixels associated with any of the color values is greater than or equal to the threshold value, the number of pixels associated with those color values is selected as the pixel count for candidate color values. In some embodiments, the representative data vectors to extract the pixel count for dominant colors are determined by arranging each selected candidate color value in descending order based on the computed number of pixels. Each arranged pixel count for color values is then compared in descending order with the rest of the arranged pixel counts for candidate color values. If any of the selected color values fall within the width of the window, some of the selected pixel counts for color values are then eliminated. The computing and eliminating operations described above are then repeated until the comparison of all of the arranged pixel counts for candidate color values is completed. The remaining pixel counts for candidate color values are then selected as the dominant color value or pixel count for representative color values that represent color values of the picture.

Dominant colors of a picture are the colors that have a higher number of pixels visibly present in a picture. FIGS. 2A and 2B illustrate extracting dominant colors in a one-dimensional space. The above-described process can also be applied to extract dominant colors in a three-dimensional color space. In a three-dimensional color space, dominant colors are derived from a histogram of a picture in a three-dimensional color space. In some embodiments, HSV color space is chosen for dominant color computation, as it depicts human perception of colors in terms of hue, saturation, and value. In some embodiments, a vector-clustering algorithm can be used to compute dominant colors from the histogram.

Assuming a threshold value of 60 and applying the above-described computing and eliminating operations for the example illustrated in FIG. 2B, yields candidate values of 5, 6, and 10. Arranging obtained candidate color values in descending order yields 10, 6, and 5 Eliminating candidate positions that fall within a window of 2 color values yields 5 and 10 as the dominant color values because the number of pixels in color value 6 is less than the number pixels in color value 5. Further, the color value 6 falls within the window position when comparing the color value 5 with other candidate color values. Therefore, color value 6 is eliminated from the candidate positions as described above.

In some embodiments, dominant colors are extracted by determining dominant colors in a picture by computing the average color value corresponding to the pixel count for representative color values. Applying this principle to obtained candidate color values 5 and 10 yields 38×5 and 50×10, respectively, as the weighted average and representative colors of the picture.

The above-described operations can be applied to gray pixel components in pictures where gray color space is one-dimensional. In this case, $d_{avg}$ is approximated as 32, and the quantization is done using 16 color values. Since the algorithm is one-dimensional, it is further simplified to incorporate the operations described above to determine the candidate color positions. Therefore, determining candidate color values using the above-described operations is very efficient in a one-dimensional gray color space.

In flow fields, data vectors are in two-dimensional space. An optic flow field is an example. The method of finding representative vectors in optic flow fields is implemented using polar coordinates having angle and magnitude as the axes. Such applications can require 3 different representations of the optic flow field. The first is the dominant vectors in the flow field, where the method is implemented in two-dimensional vector space. The second is dominant magnitudes in the flow field where the angle of the vectors is not considered and the method is implemented in one-dimensional vector space. The third is dominant angles in the flow field where the magnitude of the vectors is not considered and the method is implemented in a one-dimensional vector space.

The above-described algorithm for finding representative colors in HSV color space is applicable to flow fields by changing the vector space dimension from 3 to 2 for finding dominant vectors. The algorithm given for finding representative gray color for one-dimensional grayscale color space is also applicable in dominant magnitude computation. Because of the circular nature of the angle coordinate, the simplified algorithm for finding representative vectors in one-dimensional vector space creates a small problem for the dominant angle computation. In a circular component a starting point is not defined. The algorithm has to randomly choose a starting point in the histogram to execute the operations described above. If the starting position, indexed with i, along with a previous position, indexed with i−1, forms a dominant position, then there is a possibility that the i and i+1 will also form a dominant position resulting in a redundant representation. Redundancy is eliminated by choosing a starting point indexed as i, for which i+1 and i do not create a dominant vector. Thus, the simplified algorithm given for finding representative gray color in gray scale color space is modified for a circular axis. The modified circular axis is applicable to finding a dominant vector in one-dimensional vector spaces, such as the hue axis of HSV color space and the angle axis.

The above-described operations to extract dominant color values are computationally efficient because the operations are not iterative. Further, the operations are memory efficient as it is sufficient to have a quantized distribution of the vector space.

Figure 3:
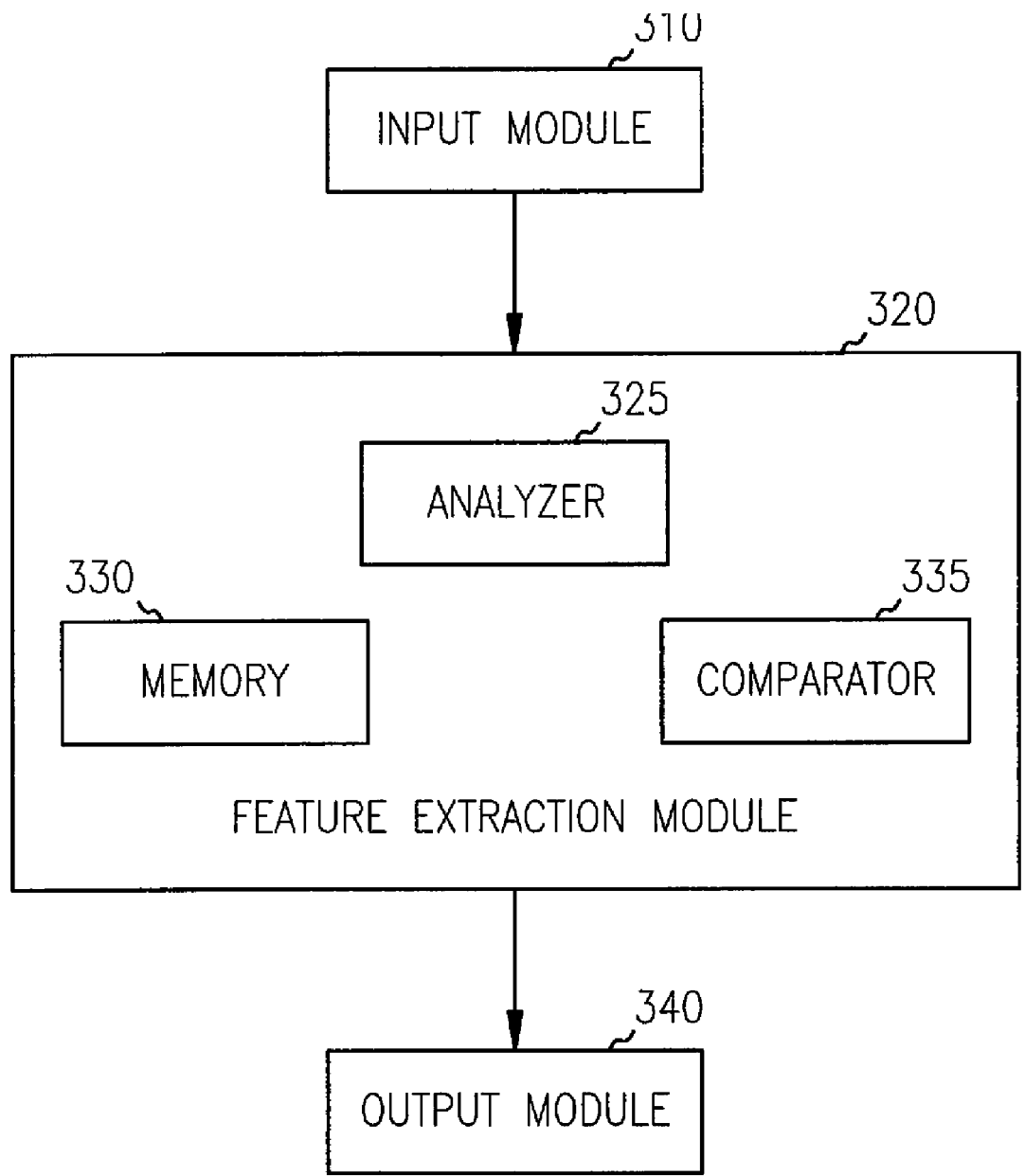
FIG. 3 is a schematic diagram illustrating one embodiment of feature extraction system.

Method 100, shown in FIG. 1 may be implemented as an input module 310, a feature extraction module 320, an analyzer 325, a memory 330, a comparator 335, and an output module 340 as shown in FIG. 3.

FIG. 3 is a schematic diagram illustrating one embodiment of a feature extraction system to extract dominant colors in a picture for picture processing. FIG. 3 includes an example of a system including an input module 310, coupled to a feature extraction module 320. Feature extraction module 320 includes an analyzer 325, a memory 330, and a comparator 335. In addition, FIG. 3 includes an output module 340 coupled to the feature extraction module 320.

In operation, input module 310 receives data vectors in a class of vector spaces of a picture. Data vectors are color values of pixels in the picture. In these embodiments, the vector spaces can include spaces, such as a one-dimensional gray scale color space, a three-dimensional RGB color space, an HMMD color space, an HSV color space, and a linear transformation matrix with reference to the RGB color space.

Analyzer 325 then receives data vectors from input module 310 and computes a tolerance distance that represents data vectors in the class of vector spaces in the picture. In some embodiments, tolerance distance is computed using parameters, such as a human perception of differentiating between data vectors in a vector space, a noise tolerance level for computation of distribution of data vectors, nature of distribution of the data vectors in the color space, and a meaningful distance between clusters. In these embodiments, clusters include grouped data vectors in the color space. The computation of tolerance distance is explained in more detail with reference to FIG. 1.

Analyzer 325 then forms a histogram of the data vectors based on a predetermined number of color values. In some embodiments, analyzer 325 quantizes the pixels to extract a small number of color levels for pixels in the picture and groups each of the quantized pixels in the picture based on intensity and a predetermined number of color values in the color space to form a histogram. The formation of the histogram using the data vectors based on the predetermined number of color values is explained in more detail with reference to FIGS. 2A and 2B.

Analyzer 325 then computes a sum of data vectors using the data vectors falling within a window based on the tolerance distance for each of the color values as the window indexes to a subsequent color value. In some embodiments, the window has a width equal to the tolerance distance. In these embodiments, each data vector includes a color value for each pixel represented based on the predetermined number of color values, such as gray scale color values in the range of 0 to 255 and RGB color values in the range of 0 to 255.

Comparator 335 then compares each computed sum of data vectors to a threshold value. Analyzer 325 then determines the representative data vectors to extract the dominant colors in the picture based on the outcome of the comparison. In some embodiments, analyzer 325 computes the sum of data vectors by computing a number of quantized pixels falling with the window by adding all of the pixels falling within the window in the histogram for each of the indexed color values. Analyzer 325 then compares each of the computed number of pixels to the threshold value, and selects candidate color values that are representative of the data vectors based on the outcome of the comparison. In these embodiments, analyzer 325 selects the number of pixels associated with those color values as a pixel count for the candidate color values, when the computed number of pixels associated with any of the color values is greater than or equal to the threshold value.

In some embodiments, analyzer 325 determines representative data vectors to extract the pixel count for dominant colors by arranging the selected pixel count for candidate color values in descending order based on the computed number of pixels. Comparator 335 then compares each of the selected pixel counts for candidate color values in the descending order with the rest of the arranged candidate color values. Analyzer 325 then eliminates any selected pixel counts for candidate color values that fall within the width of the window based on the outcome of the comparison. Analyzer 325 then repeats the comparison and elimination operations until the comparison of all arranged pixel counts for candidate color values are completed. Analyzer 325 then selects the remaining pixel counts for candidate color values as the pixel counts for the representative color values of the picture. In some embodiments, analyzer 325 extracts dominant colors by determining dominant colors in the picture by computing an average of the color values corresponding to the pixel count for the representative color values of the picture. Extracting dominant colors from the representative color values in the picture is explained in more detail with reference to FIGS. 1, 2A, and 2B.

The output module 340, then outputs the dominant colors in the picture using the determined representative data vectors. Memory 330 stores the predetermined number of color values and the gray scale and RGB scale color values in the range of 0 to 255.

Figure 4:
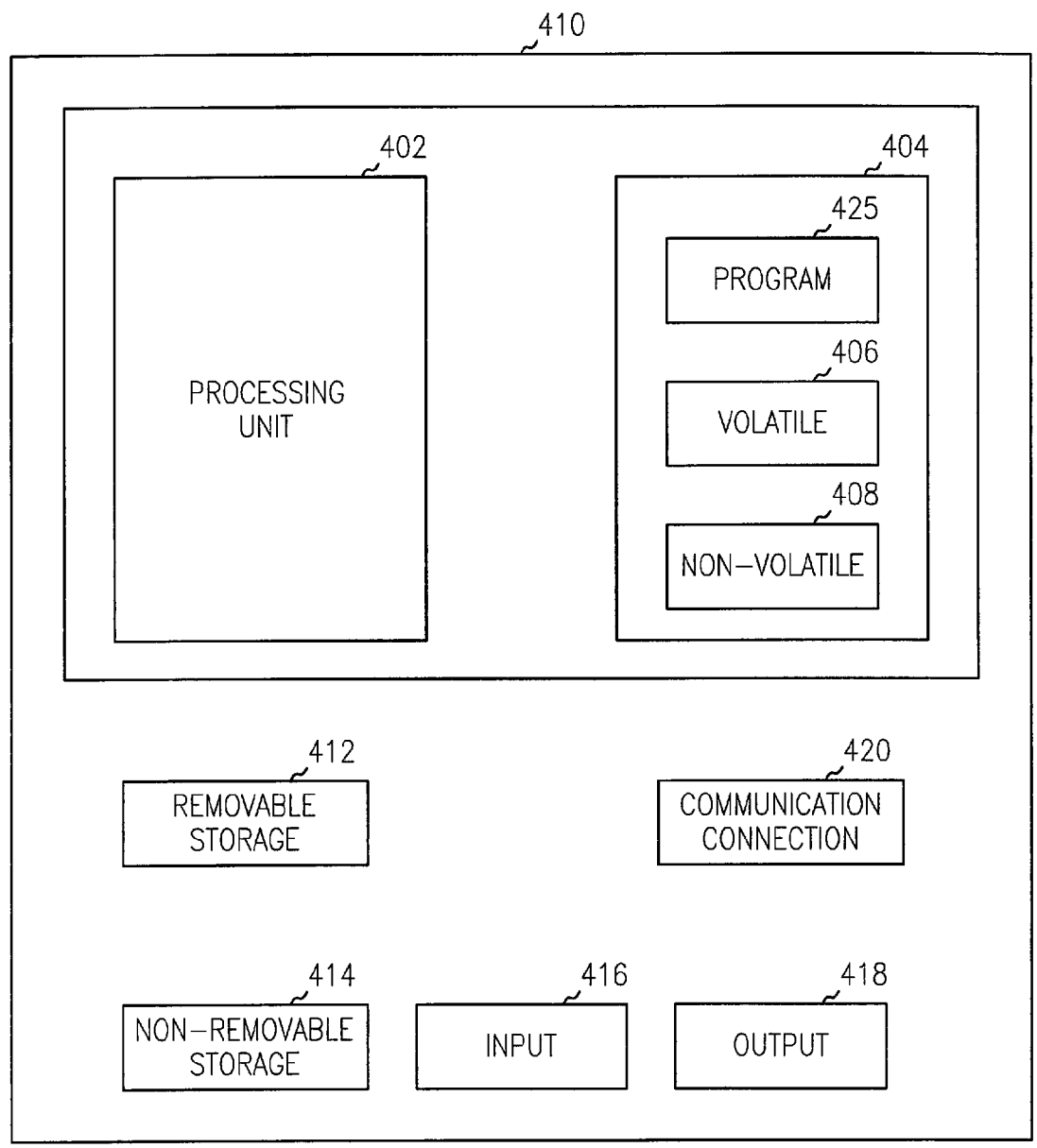
FIG. 4 shows an example of a suitable computing system environment for implementing embodiments of the present invention, such as those shown in FIGS. 1 and 3.

FIG. 4 shows an example of a suitable computing system environment 400 for implementing embodiments of the present invention, such as those shown in FIGS. 1, 2A, 2B, and 3. Various aspects of the present invention are implemented in software, which may be run in the environment shown in FIG. 4 or any other suitable computing environment. The present invention is operable in a number of other general purpose or special purpose computing environments. Some computing environments are personal computers, server computers, hand-held devices, laptop devices, multi-processors, microprocessors, set top boxes, programmable consumer electronics, network PCs, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

FIG. 4 shows a general computing device in the form of a computer 410, which may include a processing unit 402, memory 404, removable storage 412, and non-removable storage 414. Memory 404 may include volatile memory 406 and non-volatile memory 408. Computer 410 may include— or have access to a computing environment that includes—a variety of computer-readable media, such as volatile memory 406 and non-volatile memory 408, removable storage 412 and non-removable storage 414. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium. For example, a computer program 425 capable of extracting features in a picture for picture processing according to the teachings of the present invention may be included on a CD-ROM and loaded from the CD-ROM to a hard drive. The computer-readable instructions cause the computer system 400 to extract features in a picture for picture processing according to the teachings of the present invention.

CONCLUSION

The above-described invention provides an improved algorithm to retrieve pictures from large databases. The present invention accomplishes this by using a computationally efficient algorithm that does not require conversion of RGB to CIE-LUV color space.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A method of extracting features in a picture for picture processing, comprising:
   determining representative data vectors based on a tolerance distance that represents data vectors in a class of vector spaces that define the picture to extract representative features of the picture for picture processing;
   wherein extracting the features comprises extracting dominant colors in the picture;
   wherein extracting the dominant colors further comprises:
   computing the tolerance distance that represents the data vectors in the class of vector spaces of the picture;
   forming a window based on the tolerance distance;
   computing a sum of data vectors using the data vectors falling within the window for each of a predetermined number of color values;
   comparing each computed sum of data vectors to a threshold value; and
   determining the representative data vectors to extract the dominant colors in the picture based on the outcome of the comparison.

2. The method of claim 1, wherein the window has a width equal to the tolerance distance.

3. The method of claim 1, wherein the data vectors comprise:
   color values of pixels in the picture.

4. The method of claim 3, wherein the vector spaces comprise:
vector spaces selected from the group consisting of a one-dimensional gray scale color space, a three-dimensional RGB color space, an HMMD color space, an HSV color space, a linear transformation matrix with reference to RGB color space, a two-dimensional vector space of optic flow representing motion in video.

5. The method of claim 4, wherein each of the data vectors further comprise:
a color value for each of the pixels represented based on the predetermined number of color values selected from the group consisting of gray scale color values in the range of 0 to 255 and RGB color values in the range of 0 to 255.

6. The method of claim 1, wherein computing the tolerance distance comprises:
deriving the tolerance distance based on parameters selected from the group consisting of human perception of differentiating between the data vectors in the vector space, noise tolerance level for computation of distribution of data vectors, nature of distribution of the data vectors in the color space, and meaningful distance between clusters.

7. The method of claim 6, wherein clusters comprise:
grouped data vectors in the color space.

8. The method of claim 6 and further comprising forming a histogram of the data vectors based on the predetermined number of color values, wherein forming the histogram comprises:
quantizing the pixels to extract a small number of color levels for pixels in the picture; and
grouping each of the quantized pixels in the picture based on the intensity and the predetermined number of color values in the color space.

9. The method of claim 8, wherein the threshold value comprises:
a minimum number of pixels that represents the distribution of pixels in the picture.

10. The method of claim 8, wherein computing the sum of data vectors further comprises:
computing a number of quantized pixels falling within the window by adding all pixels falling within the window in the histogram for each of the indexed window color values;
comparing each computed number of pixels to the threshold value; and
selecting candidate color values that are representative of data vectors based on the outcome of the comparison.

11. The method of claim 10, wherein selecting the candidate color values comprise:
if the computed number of pixels associated with any of the color values is greater than or equal to the threshold value, then selecting the number of pixels associated with those color values as the pixel count for the candidate color values.

12. The method of claim 10, wherein determining the representative data vectors to extract the pixel count for dominant colors further comprises:
arranging the selected pixel count for candidate color values in descending order based on the computed number of pixels;
comparing each arranged pixel count for candidate color values in the descending order with the rest of the arranged candidate color values;
eliminating any selected pixel count for candidate color values that fall within the width of the window based on the outcome of the comparison;
repeating the comparing and eliminating operations until the comparison of all arranged pixel count for candidate color values are completed; and
selecting remaining pixel count for candidate color values as the pixel count for the representative color values of the picture.

13. A method comprising:
for each of multiple pictures to be stored in a database, determining representative data vectors based on a tolerance distance that represents data vectors in a class of vector spaces that define the picture;
extracting dominant colors in the picture;
wherein extracting the dominant colors further comprises:
computing the tolerance distance that represents the data vectors in the class of vector spaces of the picture;
forming a window based on the tolerance distance;
computing a sum of data vectors using the data vectors falling within the window for each of a predetermined number of color values;
comparing each computed sum of data vectors to a threshold value; and
determining the representative data vectors to extract the dominant colors in the picture based on the outcome of the comparison; and
storing such representative data vectors in association with multiple features of the picture in a database to allow retrieval of images as a function of the representative data vectors.

14. The method of claim 13 wherein the data vectors comprise color values of pixels in a picture.

15. The method of claim 14 wherein the color values are selected from the group consisting of one-dimensional gray color space, three-dimensional RGB color space, HMMD color space, HSV color space and a linear transformation matrix with reference to RGB color space.

16. The method of claim 14 wherein the color values range between 0 to 255.

17. The method of claim 13 wherein the tolerance distance is derived as a function of at least one of human perception to differentiate between data vectors, noise tolerance level for computation of distribution of data vectors, nature of distribution of data vectors in a color space and meaningful distance between one or more groups of data vectors for a given vector or color space.

18. A method comprising:
for each of multiple pictures to be stored in a database, determining representative data vectors based on a tolerance distance that represents data vectors in a class of vector spaces that define the picture;
determining dominant colors in the picture by computing average of the color values corresponding to a pixel count for representative color values of the picture; and
extracting dominant colors in the picture;
wherein extracting the dominant colors further comprises:
computing the tolerance distance that represents the data vectors in the class of vector spaces of the picture;
forming a window based on the tolerance distance;
computing a sum of data vectors using the data vectors falling within the window for each of a predetermined number of color values;
comparing each computed sum of data vectors to a threshold value; and
determining the representative data vectors to extract the dominant colors in the picture based on the outcome of the comparison; and
storing such representative data vectors in association with multiple features of the picture in a database to allow retrieval of images as a function of the representative data vectors.

* * * * *